United States Patent [19]
Ghyczy

[11] 3,966,338
[45] June 29, 1976

[54] COUPLING PIECE

[76] Inventor: Peter Ghyczy, Kasteel Nieuwenbroek, Beesel, L, Netherlands

[22] Filed: July 24, 1975

[21] Appl. No.: 598,585

[30] Foreign Application Priority Data
Aug. 3, 1974 Germany............................. 7426458

[52] U.S. Cl. ............................. 403/192; 403/172; 108/156
[51] Int. Cl.² ........................................ A47B 3/06
[58] Field of Search ........... 403/231, 172, 174, 176, 403/178, 219, 199, 218, 192; 52/756, 753 D; 108/156

[56] References Cited
UNITED STATES PATENTS

| | | |
|---|---|---|
| 3,229,334 | 1/1966 | Thome.......................... 403/231 X |
| 3,830,030 | 8/1974 | Yoshida............................ 52/756 X |
| 3,837,754 | 9/1974 | Malcik............................ 403/263 X |
| 3,883,104 | 5/1975 | Delafield........................ 108/156 X |

*Primary Examiner*—Andrew V. Kundrat
*Attorney, Agent, or Firm*—Martin A. Farber

[57] ABSTRACT

A coupling piece formed as a cubical-shaped cup having a closed cup-bottom, which is disposed on a stud of a vertical member, and which cup is formed with a slot in at least one side wall thereof, the slot opening into the open front side thereof. A guide web of a peg member is inserted in the slot, the peg member being secured to one horizontal member and being provided with a bearing plate operatively cooperating with the cap.

6 Claims, 12 Drawing Figures

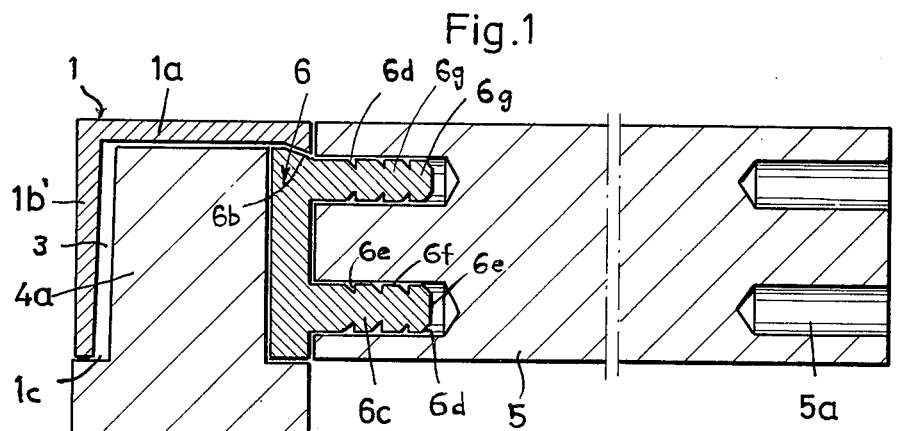
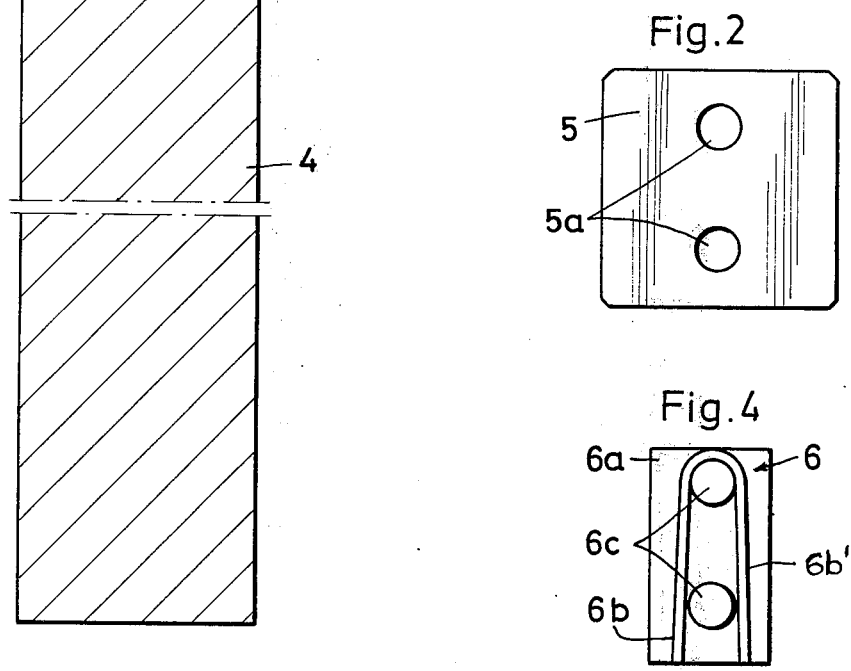
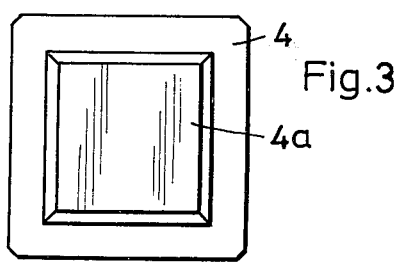
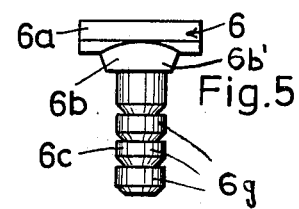

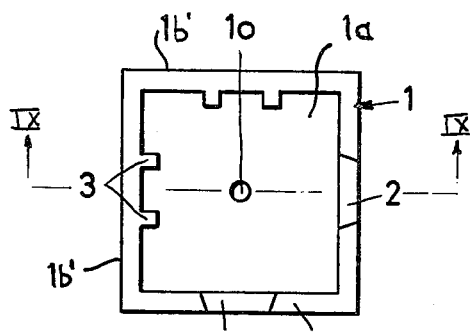
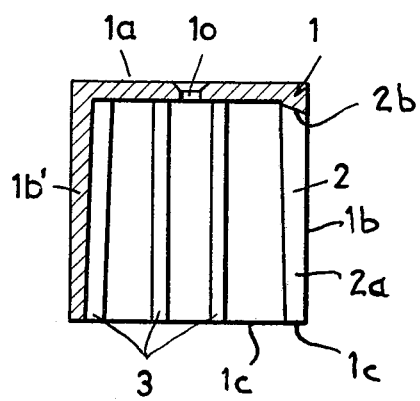
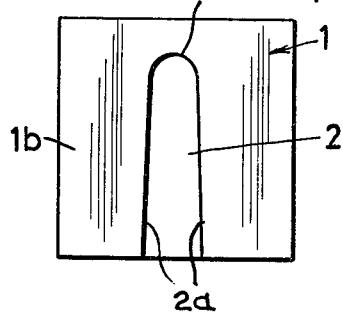
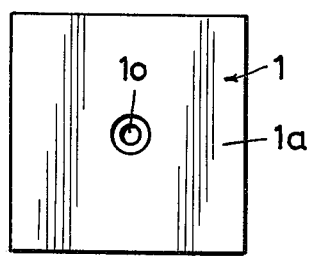
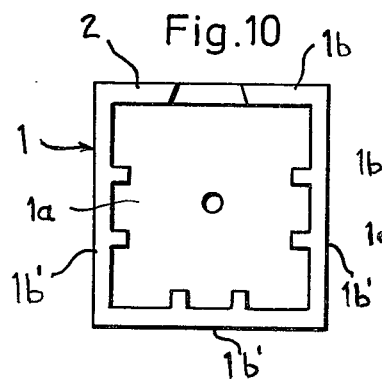
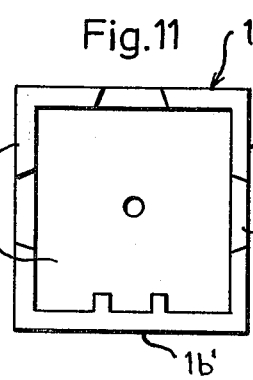
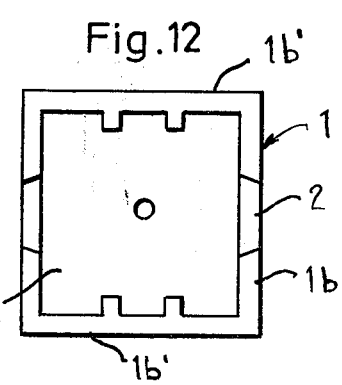

COUPLING PIECE

The invention relates to a coupling piece for connection of a vertical member to at least one horizontal member particularly for the manufacture of furniture, such as for example, tables, shelves, cupboards, closets, seats, and arm chairs, among other things.

Coupling pieces for the connection of a vertical member with at least one horizontal member are already known, by which star-shaped junction points are used, on the pins of which there are fastened rods made of metal tubing. These known coupling pieces are not suitable for connecting wooden members with one another.

It is an object of the present invention to provide a coupling piece for connection of a vertical member with at least one horizontal member, which particularly is to be used in the production of furniture, and therefore is for use with wooden members.

The invention resides in the formation of the coupling piece as a cubical-shaped cup having a closed bottom, which is disposed on a stud of a vertical wooden member, and which cup is formed with a slot in at least one side wall thereof, the slot opening into the open front side thereof. A guide web or stay of a peg member is inserted in the slot, the peg member being secured to one horizontal wooden member and being provided with a bearing plate.

By means of the formation of the coupling piece in accordance with the invention, it is possible to connect wooden members with one another in a type of junction point in a simple manner, the wooden members being either provided with a stud, or a peg member, so that different frames for detachable furniture of the most different types can be produced by use of the parts in accordance with the invention, and also by purchasers by means of simple assembly of the individual parts.

The hollow interior space of the cubical cup is complementarily filled here by the stud which is formed on the vertical wooden member. In order to guarantee a proper fastening of this stud to the cup which serves as the coupling piece, according to a further feature of the invention, guide ribs are formed on the inside of the unslotted side walls of the coupling piece.

The peg member which serves to secure the horizontal members to the coupling piece is fastened to the corresponding horizontal member by means of two peg pins in accordance with another cooperative feature of the present invention. The slots for reception of the guide stay of the peg member are undercut or countersunk in accordance with a further feature of the invention, whereby the guide stay of the peg member is formed with correspondingly inclined guide surfaces.

The level of the guide ribs on the inner sides of the unslotted side walls of the cup is formed corresponding to the thickness of the bearing plate of the peg member so that independent of the number of the slots, there results a secure fastening of the horizontal wooden members to the coupling piece. In order to secure the stud of the vertical wooden member positively to the cup-shaped coupling piece during the occurrence of higher loads and stresses, it is furthr proposed in accordance with the invention to provide a hole in the botton of the cubic-shaped cup for a screw which holds the vertical member.

With the above and other objects in view, the present invention will become more clearly understood from the detailed description of a preferred embodiment in connection with the accompanying drawings, of which:

FIG. 1 is a partially broken away elevational crosssectional view of a coupling piece in accordance with the invention connecting a vertical wooden member with a horizontal wooden member;

FIG. 2 is a front view of the horizontal wooden member of FIG. 1;

FIG. 3 is a plan view of the vertical wooden member of FIG. 1;

FIG. 4 is a side view of the peg member used in FIG. 1;

FIG. 5 is a plan view of the peg member according to FIGS. 1 and 4;

FIG. 6 is a side view of a cubical cup in accordance with the present invention;

FIG. 7 is a bottom view of the cup according to FIG. 6;

FIG. 8 is a plan view of the cubical cup according to FIG. 6;

FIG. 9 is a section through the cup taken along the lines IX—IX in FIG. 7;

FIG. 10 is a bottom view corresponding to FIG. 7 of a second embodiment of the cubical cup;

FIG. 11 is a bottom view corresponding to FIG. 7 of a third embodiment of the cubical cup; and FIG. 12 is a further corresponding bottom view of a fourth embodiment of the cubical cup of the present invention.

Referring now to the drawings, and more particularly to FIGS. 1–9, a coupling member 1 in accordance with the invention formed as a cubical-shaped cup 1 with a closed cup-bottom 1a is used to connect a vertical wooden member 4 to at least one horizontal wooden member 5. The vertical wooden member 4 is for this purpose, as may be recognized in FIGS. 1 and 3, provided with a stud 4a which is pushed into the the hollow interior space of the cubical-shaped cup 1. The horizontal wooden member 5 possesses two bores, 5a as may be seen in FIGS. 1 and 2, in which a peg member 6 having two set pins or pegs 6c is inserted and secured, the pegs 6c being formed preferably with inclined, perpendicular and longitudinal surfaces 6d, 6e, and 6f, respectively, forming a plurality of cylindrical-frustoconical heads 6g. The formation of the peg member 6 is illustrated in FIGS. 1, 4 and 5.

The peg member 6, which is secured by means of its two set pins 6conto the front surface of the horizontal member 5, possesses a bearing plate 6a which is connected over a guide web 6b with the two set pins 6c. The guide web 6b of the peg member 6 (which peg member is fastened to the horizontal wooden member 5) is pushed into a complementary slot 2, from the open front side 1cof the cubical-formed cup 1, the slot 2 being formed in at least one side wall 1b of the cubical-shaped cup 1. The bearing plate 6a of the peg member 6 thereby retains the side wall 1b of the cup 1 so that in this manner the horizontal wooden member 5 is held fixed on the cubical cup 1.

In order to be able to form the stud 4a of the vertical wooden member 4 always uniformly, independent of the number of horizontal wooden members 5 to be fastened to the cubical cup 1, guide ribs 3 are arranged on the interior side of the unslotted side walls 1b' of the cubical cup 1. The elevation of the guide ribs 3 corresponds to the thickness of the bearing plate 6a of the peg member 6. In this manner there results a symmetrical formation of the stud 4a on the verticl wooden bar 4, as may be recognized in FIG. 3.

FIGS. 10, 11 and 12 show views corresponding to FIG. 7 of three different embodiments of the cubical cup 1. Whereas the cup 1, illustrated in FIGS. 6 to 9, serves for fastening two horizontal wooden members 5 to the vertical member 4, the two horizontal wooden members being disposed at right angles relative to each other, on the other hand with the embodiment of the cup 1 according to FIG. 10 merely one horizontal wooden member 5 can be fastened to the vertical wooden member 4, since only one slot 2 is formed in the side walls of the cup 1. The embodiment according to FIG. 12 shows a cup 1 in which two opposite side walls 1b are provided each with one slot 2, so that two horizontal wooden bars 5 which extend colinearly can be fastened on opposite sides of the cup 1. With the embodiment according to FIG. 11, three horizontal wooden members 5 can be secured to one vertical wooden member 4. Of course it is also possible furthemore, to provide the fourth side wall of a cup 1 with a slot 2 for connection of four horizontal members 5 to one vertical member 4 (not shown). In order to hold the vertical wooden member 4 on the cup 1 also during the occurrence of higher loadings, the cup 1 can be provided with a hole 1o in its bottom 1a through which a screw (not illustrated) can be screwed into the stud 4a of the vertical wooden member 4.

In order to manufacture a frame, for example, for a table, four cubical cups 1 according to FIGS. 6 to 9 are used, as well as four vertical wooden members 4 provided with studs 4a. Moreover a peg member 6 is fastened to four horizontal wooden members 5 on each end thereof, the horizontal wooden members each being provided on both of their respective ends with two bores 5a, wherein the set pins 6c of the peg member 6 are forced into the bores 5a. Preferably still glue, paste or other adhesive substances are added to the pins 6c and the bores 5a to aid the fastening there-together.

The guide webs 6b of the peg member 6 which is fastened to the horizontal members 5 are then pushed into the slots 2 of the four cups 1, so that the bearing plates 6a of the peg members 6 come to lie in the interior of the cubical cups 1. In this way the horizontal wooden members 5 are secured onto the cups 1 such that a rectangular frame is produced. Moreover, the studs 4a of the vertical wooden leg members 4 are pressed into the hollow interior spaces of the cubical cups 1. If it is desired, the wooden leg members 4 can be secured by screws to the cups 1. If this frame, which is equipped with four legs formed by the vertical wooden members 4 is furthemore placed on the floor, the bearing plates 6a and the guide webs 6b of each peg member 6 lie on the edge of the corresponding vertical wooden member 4, which is produced by the formation of the stud 4a. In this manner there results a direct transmission of the forces acting on the horizontal wooden members 5 to the corresponding vertical wooden members 4. The junction point formed by the cubical-formed cup 1 receives essentially only those forces which are required to hold the frame together. The table frame produced in the above-described manner is completed into a table by laying thereon or joining thereto a table top.

In the previously described manner, not only can tables and shelves be produced, but also seats, chairs, arm chairs, easy chairs, cupboards, closets and other things, whereby the vertical as well as the horizontal wooden members 4 and 5 can be provided with grooves or notches for joining of wall panels made of wood, synthetic material or glass, or still can be provided with hinges for the moveable pivoting of flaps or doors. Also cushions, padding or upholstery elements can be fastened on the wooden members 4 and 5, if the frames are to be used for the production of seats, arm- or easy-chairs, or sofas.

Cooperative features of the invention which provide the secure fastening of the assembly are the inwardly widening tappering of the slot 2, as well as linear diverging sides 2a thereof widening in a direction from its semicircular end 2b (adjacent the cup-bottom 1a) into the open front side 1c, the guide web 6b having its outer surface 6b' complementary to the above-mentioned formations of the slot 2 for complementary engagement therein in the operative assembly position of FIG. 1. Further the lateral side walls 1b, 1b' of the cup 1 are thicker at the portion thereof adjacent the cup-bottom 1a narrowing toward the portion adjacent the open front side 1c, the inner side thereof following the shape of the stud 4a of the vertical member 4. The outer side surfaces of the lateral sides 1b, 1b' are substantially colinear with the outer sides of the vertical member 4.

While I have described several embodiments of the invention, it is to be understood that these embodiments are given by illustration only and not in a limiting sense.

I claim:

1. A coupling member for connecting a vertical member with at least one horizontal member, particularly for the production of furniture, comprising a substantially cubical-shaped hollow cup having lateral side walls and a closed cup-bottom and being open on a front side opposite said cup-bottom so as to be placed on a stud of a vertical member, at least one of said side walls being formed with a slot extending into said open side and adapted to receive a guide web of a peg member, the latter for being secured to a horizontal member and having a bearing plate, said side walls include unslotted walls, and guide ribs disposed on an inner side of said unslotted walls relative to said hollow cup.

2. The coupling member, as set forth in claim 1, wherein said guide ribs have an extent corresponding to the thickness of said bearing plate of said peg member.

3. Coupling member for connecting a vertical member with a least one horizontal member, particulaly for the production of furniture, comprising a substantially cubical-shaped hollow cup having lateral side walls and a closed cup-bottom and being open on a front side opposite said cup-bottom so as to be placed on a stud of a vertical member, at least one of said side walls being formed with a slot extending into said open side and adapted to receive a guide web of a peg member, the latter for being secured to a horizontal member and having a bearing plate, a peg member having set pin means for fastening said peg member to a horizontal member, said peg member includes a bearing plate substantially larger than said slot in said at least one side wall of said cup, and a guide web connected to said bearing plate and substantially complementary to said slot, said set pin means being integral with said bearing plate, in an operative assembly position, said guide web is detachably complementarily disposed in said slot with said bearing plate disposed in the hollow interior of said cup abutting an inner side of said at least one side wall, said slot is undercut in said at least one side wall, and said guide web of said peg member includes guide surfaces which are inclined corresponding to said slot.

4. The coupling member, as set forth in claim 3, wherein said slot is tappered in a direction narrowing from said inner side of said at least one side wall toward an outer side thereof as well as widening from adjacent said cupbottom into said open front side.

5. The coupling member, as set forth in claim 4, wherein said slot is elongated having tappering linear sides joining a semicircular portion thereof adjacent said cup-bottom.

6. A coupling member for connecting a vertical member with at least one horizontal member, particularly for the production of furniture, comprising a substantially cubical-shaped hollow cup having lateral side walls and a closed cup-bottom and being open on a front side opposite said cup-bottom so as to be placed on a stud of a vertical member, at least one of said side walls being formed with a slot extending into said open side and adapted to receive a guide web of a peg member, the latter adapted to be secured to a horizontal member and having a bearing plate integral with said web.

said peg member having set pin means for fastening said peg member to a horizontal member, said slot is undercut in said at least one side wall, and said guide web of said peg member includes guide surfaces which are inclined corresponding to said slot.

* * * * *